Jan. 28, 1930.   C. GREINER   1,744,884
METHOD AND MACHINE FOR THE PRODUCTION OF SOLID
GLUE AND GELATIN IN DROP OR LENS SHAPE
Filed Jan. 17, 1928   4 Sheets-Sheet 1
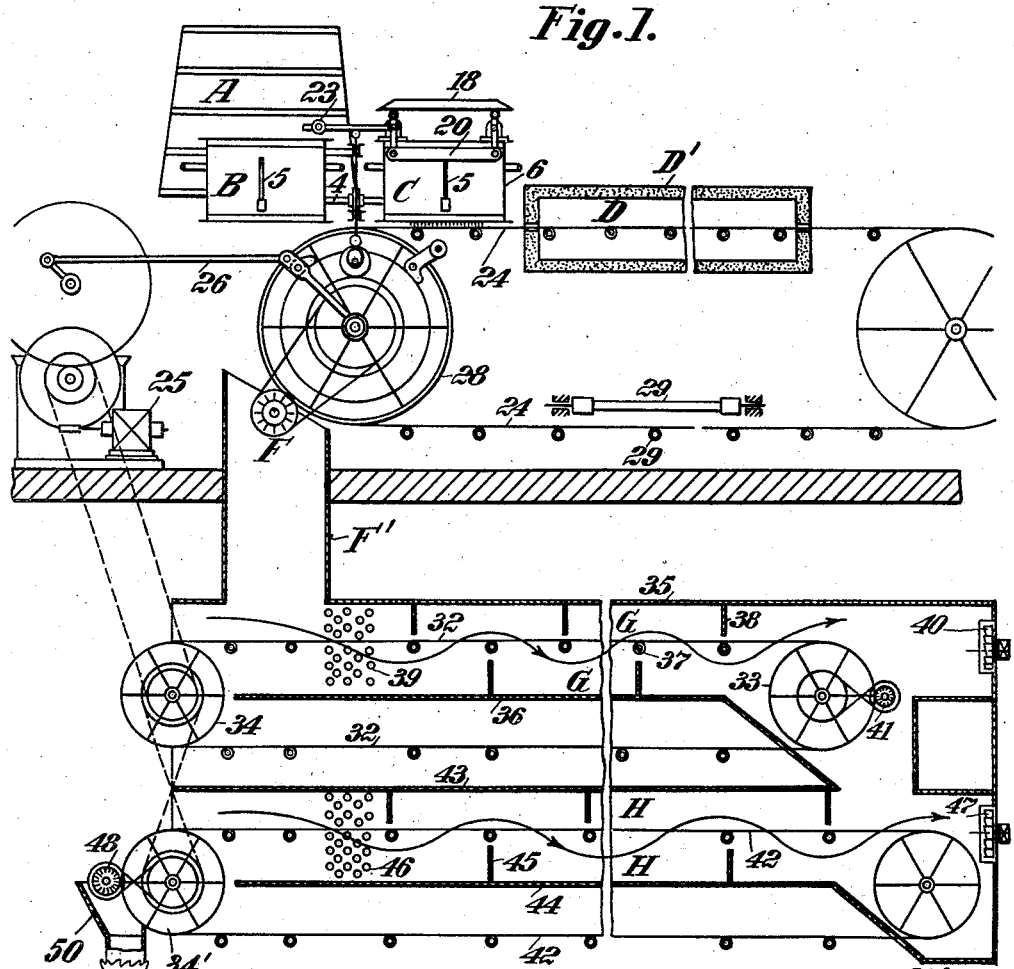
Fig.1.
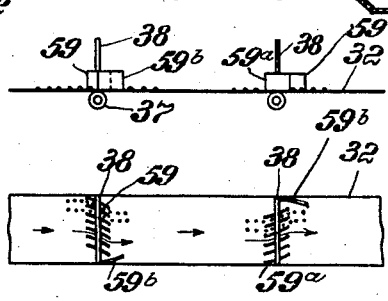
Fig.12.
Fig.13.
Inventor
Carl Greiner, Deceased
by Anna Greiner, Administratrix.
By Pennie, Davis, Marvin & Edmonds
Attorneys

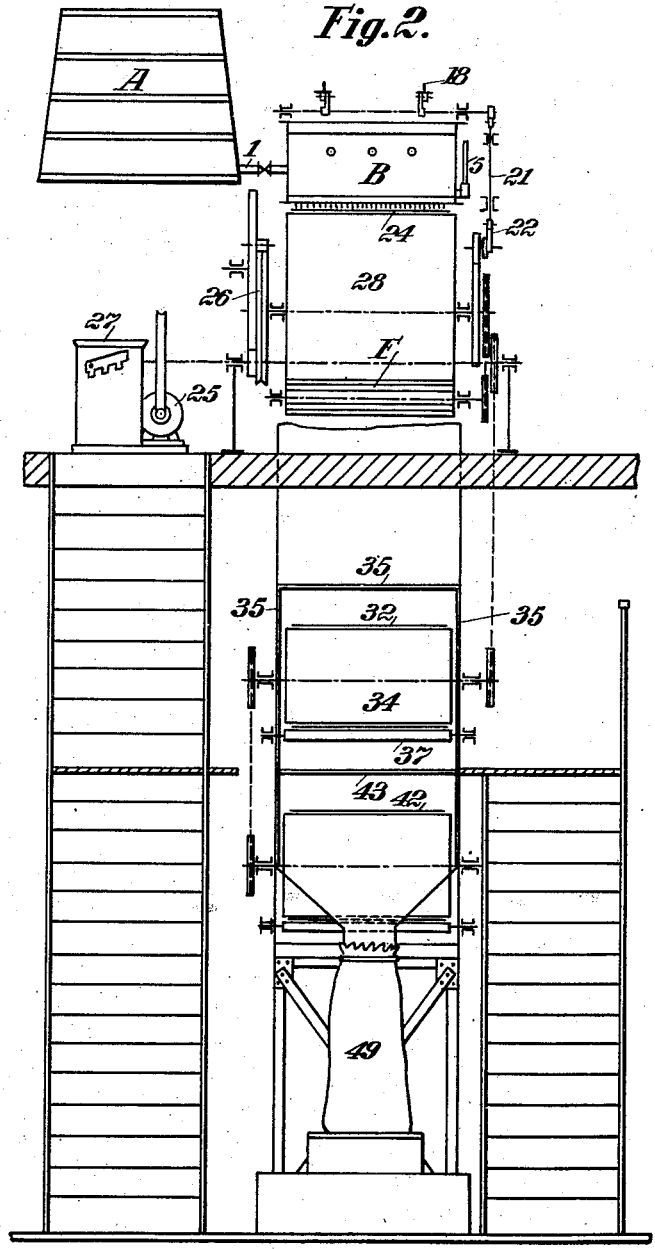

Jan. 28, 1930.                    C. GREINER                    1,744,884
               METHOD AND MACHINE FOR THE PRODUCTION OF SOLID
                    GLUE AND GELATIN IN DROP OR LENS SHAPE
                         Filed Jan. 17, 1928        4 Sheets-Sheet 3
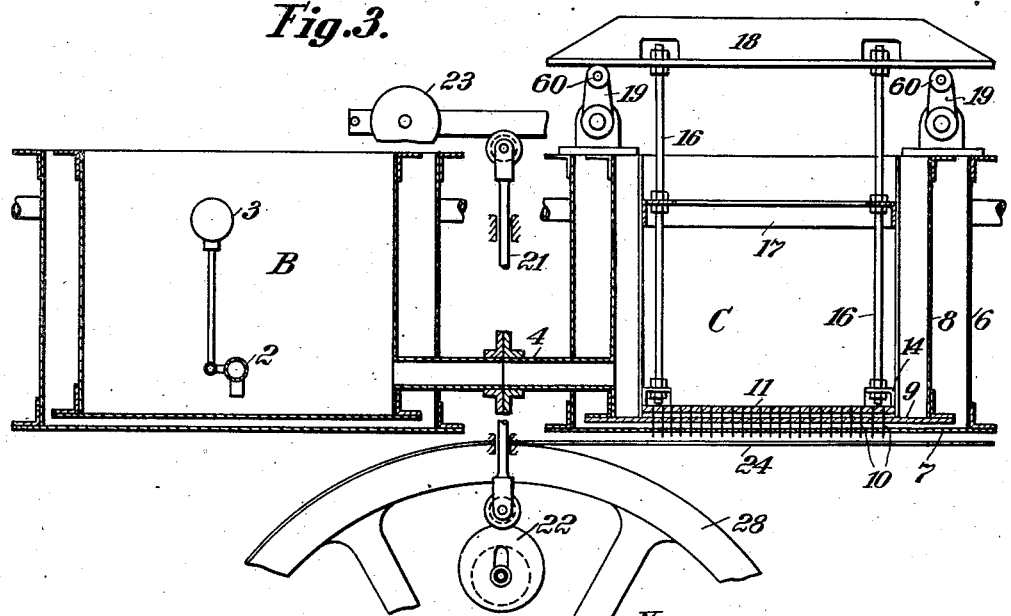
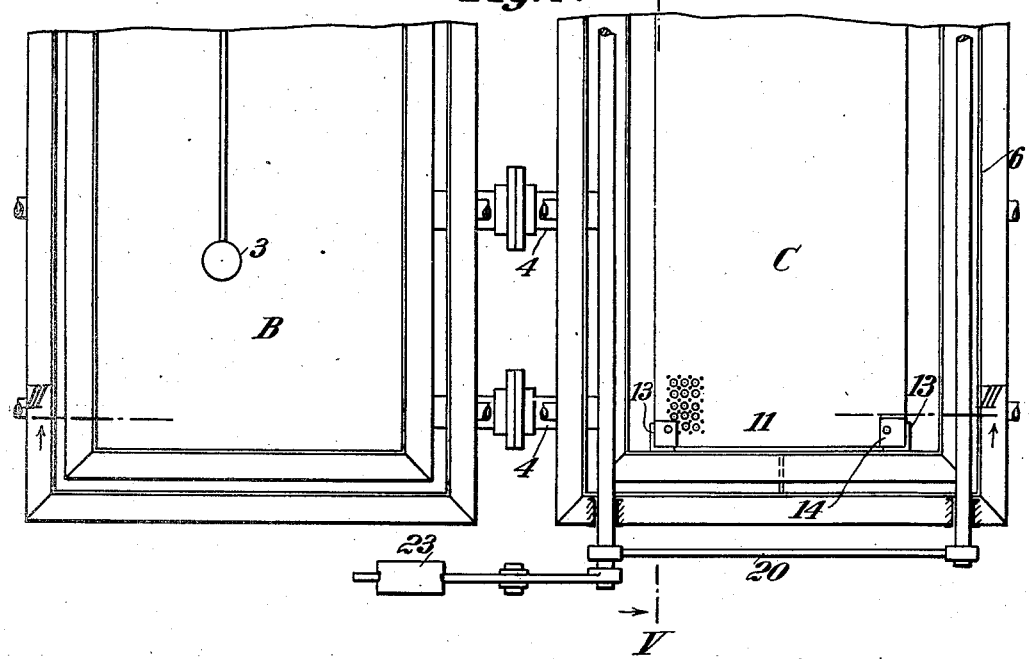

Jan. 28, 1930. C. GREINER 1,744,884
METHOD AND MACHINE FOR THE PRODUCTION OF SOLID
GLUE AND GELATIN IN DROP OR LENS SHAPE
Filed Jan. 17, 1928 4 Sheets-Sheet 4
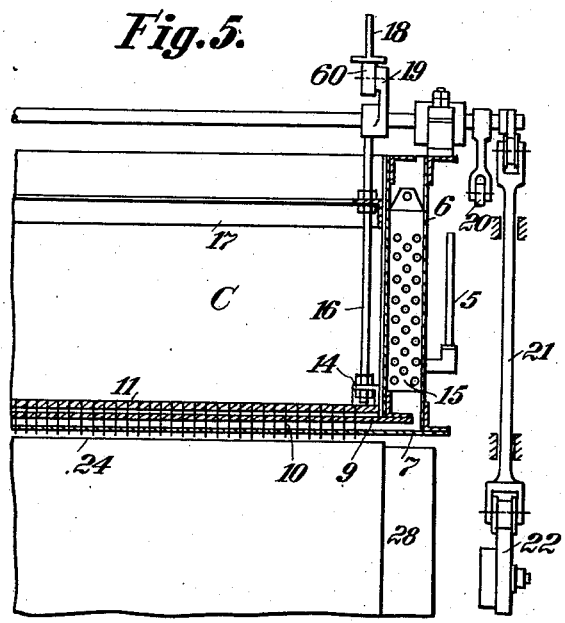
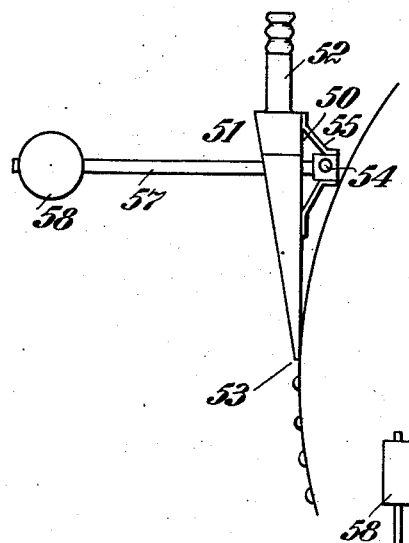
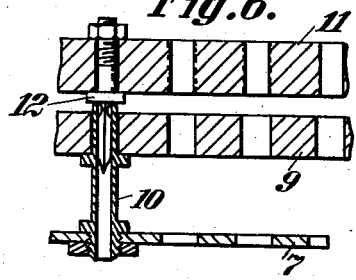
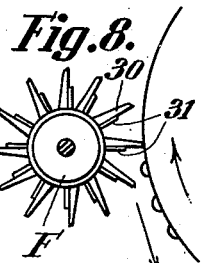
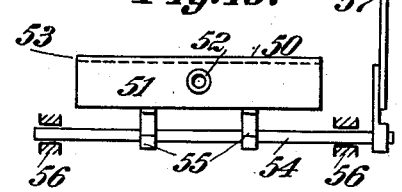
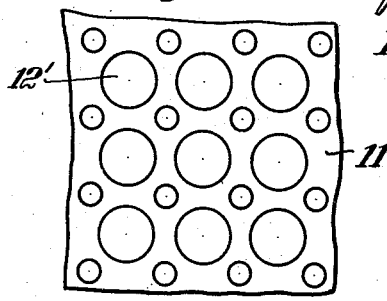
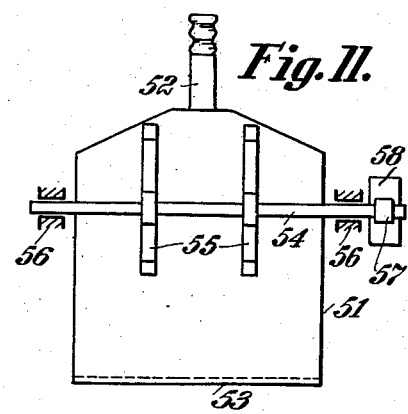
Inventor
Carl Greiner, Deceased,
by Anna Greiner, Administratrix Patented Jan. 28, 1930

1,744,884

UNITED STATES PATENT OFFICE

CARL GREINER, DECEASED, LATE OF NEUSS-ON-THE-RHINE, GERMANY, BY ANNA GREINER, NÉE BRECHT, ADMINISTRATRIX, OF NEUSS-ON-THE-RHINE, GERMANY

METHOD AND MACHINE FOR THE PRODUCTION OF SOLID GLUE AND GELATIN IN DROP- OR LENS- SHAPE

Application filed January 17, 1928. Serial No. 247,398, and in Germany March 28, 1927.

The converting of liquid gelatin and glue into the solid state hitherto was generally effected by making the concentrated hot solutions of gelatin or glue flow onto endless conveyer-bands on which it was solidified whereupon it was cut into plates. These plates had then to be brought in separate drying plants. The drying in these plants requires about 7 to 10 days.

It has already been proposed to solidify glue and gelatin in the shape of beads by allowing the drops of liquid gelatin or glue, flowing out of nozzles, to drop into a cooled liquid, in which they will solidfy. This process, however, shows the inconvenience that the glue- or gelatin beads formed must subsequently be freed of the liquid and dried again. It has further been proposed to allow the drops from the nozzles or the like to fall on a support coated with a fatty substance, said support moving along under the nozzles, and to solidify the drops on this support. But in this case the solidified drops must subsequently be liberated of the adhering fatty substance, as paraffin, wax, mineral-oil or the like, this being difficult and requiring much time.

The method according to present invention differs from the commonly used methods by its great simplicity, cheapness and rapid execution. Dry drops of gelatin or glue in the shape of semi-lenses are obtained by it directly from the concentrated hot liquids in a perfectly dry state, ready for packing and in one operation only, without it being necessary to liberate them subsequently from any adhering foreign substances.

The new method essentially consists in that the liquid drops of inspissated gelatin or glue, dropping onto a conveniently cooled conveying element, are exposed first to a temperature below 0° C., whereupon they are heated in order to remove from them the water or ice which has separated from the solidified colloid particles. The colloid particles dropped upon the conveying element may be repeatedly and alternately conducted in this manner through freezing and thawing zones. After having passed through the freezing and thawing zones the colloid particles are stripped off the conveying element by means of a scraper or similar instrument, and conveyed to a drying chamber where they are preferably exposed to the influence of a heated air current. In this manner it is possible to obtain, in less than one hour, from the liquid initial material the perfectly dry particles ready for transport in the shape of semi-lenses.

For carrying out this method a container is preferably used as a dropping device, the bottom plate of which has discharge-tubes and in which a plate is arranged to be moved up and down by a suitable driving mechanism, said movable plate having passages for the liquid and being provided with pins projecting into the discharge tubes of the bottom plate.

Whereas the conveying element for conveying the drops through the freezing and thawing zones consists preferably of an uncovered endless metal band, the conveying elements on which the solid drops are conveyed through the drying chamber preferably consist of endless bands of metal gauze through which the drying air may flow from above to below and from below to above, said drying air being preferably guided accordingly by convenient ribs or obstacle plates.

For separating the solidified colloid particles from the metal band after they have passed through the freezing and thawing zones and for transferring the same upon the drying band, a scraper is preferably used which is connected with a blower conducting air or gas under pressure to the point where the scraper is working, the removing of the solidified particles from the metal band thereby being substantially facilitated and accelerated.

A machine suitable for carrying out the new method is illustrated, by way of example, in the accompanying drawings, in which:—

Fig. 1 is a front elevation showing the whole plant partly in longitudinal section, middle portions being broken away to make the illustration shorter;

Fig. 2 is a side elevation of the plant, partly in section;

Fig. 3 is a longitudinal section on line

III—III of Fig. 4 through the gelatin or glue containers comprising the dropping device, on a larger scale;

Fig. 4 is a part top plan view of the gelatin or glue containers;

Fig. 5 shows part of the container with the dropping device in a section on line V—V of Fig. 4 through the dropping device, the parts on the outer side of the container belonging thereto being shown in elevation;

Figs. 6 and 7 show on a still greater scale parts of the dropping device in section and in top plan view;

Fig. 8 shows a device for removing the solidified drops from the conveying band;

Fig. 9 shows in side elevation another device designed for the same purpose;

Fig. 10 is a top plan view of Fig. 9;

Fig. 11 is a rear view of Fig. 9;

Fig. 12 shows a part of the drying band with obstacle plates and turning prongs arranged on said plates in side elevation;

Fig. 13 is a top plan view of Fig. 12.

In these drawings A designates a reservoir for the liquid gelatin or glue. From this reservoir a connecting pipe 1 leads to a double-walled vessel B constructed as a water bath and comprising a throttle valve 2 and a float 3 designed to maintain the liquid in this vessel permanently on a constant level. With the vessel B a double-walled vessel C forming the dropping device is connected by pipes 4. The vessels B and C each have a thermometer 5. The double wall of the dropping device C serves, same as that of vessel B, to heat or to cool the liquid gelatin or glue according to their solidifying points by means of a water bath.

The dropping device C consists of an outer vessel 6 having a thin perforated bottom plate 7, and of an inner vessel 8 having a thick bottom plate 9. In the bottom plate 9 metal tubes 10 (Fig. 6) are inserted, which extend to below the thin bottom plate 7 of the outer vessel and tightly close the openings of this plate for the contents in the room between the inner and outer vessels 8 and 6. In Fig. 6 only one of these tubes is shown in section as being inserted in the openings provided for this purpose in plates 7 and 9. In the vessel 8 a plate 11 is arranged adapted to be moved up and down, valve pins 12 (Fig. 6) being screwed into this plate and being arranged in such a manner as to be adapted to penetrate into the tubes 10. In Fig. 6 also only one of these pins is shown, as being inserted in the openings provided for this purpose in plate 11. The plate 11 further has holes 12' (Fig. 7) at the sides of the pins 12 or the openings serving for inserting these pins, said holes 12' serving as passages for the liquid gelatin or glue. In Fig. 7 a portion of plate 11 is shown in top plan view in the state prior to the inserting of the pins 12.

The plate 11 is guided by guide pieces 14 in four angular guides 13 (Fig. 4). The plate 11 is connected by the guide pieces 14 with rods 16 extending through a guide frame 17 arranged in the vessel. Above this vessel cross bars 18 are arranged on the ends of the rods 16 and adapted to be raised and lowered by means of cranks 19 provided with rollers 60. The cranks 19 are driven from an adjustable eccentric 22 through the intermediary of a connecting rod 21 and of a connecting rod 20 (Fig. 5). A counter weight 23 serves to ensure the lowering of cranks 19 and of plate 11 after the lifting caused by the rotation of the cranks 19. According to the adjusting of the eccentric 22 to a greater or less great stroke the size of the drops discharged from the device may be altered.

In the space between the vessels 6 and 8 perforated slides 15 are arranged adapted to be moved up and down to ensure a suitable water circulation.

Beneath the dropping device C an endless metal band 24 is arranged, which may be made for instance of aluminium or any other suitable metal. The conveying band 24 is intermittently moved in a stepwise manner from a motor 25 of convenient construction by means of a transmitting mechanism 26 and a drum 28, over which this endless band 24 is guided. The amplitude of this intermittent movement corresponds to the width of that portion of the bottom plate 9 which contains the dropping tubes, i. e. also to the width of the plate 11. By a convenient gear, for instance a so-called Norton-gear, 27 (Fig. 2) the amplitude of the stepwise movement of the metal band 24 can be decreased or increased per time unit. The metal band 24 is cooled by the drum 28 which is internally cooled in a convenient manner known per se. For this purpose for instance cooling liquid may be supplied to this drum through pipes which are not shown in the drawings.

The metal band 24 travels through a space D having insulated walls D' and adapted to be cooled to any desired temperature. Rollers 29 serve for guiding the metal band 24, one of said rollers being shown in Fig. 1 in top plan view between the two branches of the endless band 24. As shown, these rollers 9 are cut out at the middle portion so that at these portions the band does not come into contact with the roller. This is specially important for the rollers which support and guide the lower part or branch of the endless band 24.

Against that portion of the band 24 which is moving over the drum 28 when returning from below, a suitably journalled stripping or throwing roll F is pressed from below (Figs. 1 and 8), which is rotated in a convenient manner from the drum 28. The roll F is provided with rubber plates 30, preferably of slightly conical shape, and the plates 30 are arranged in such a manner that they project radially from the body of the roll. Metal ribs 31 designed for a purpose which will be hereinafter described are fixed in the body of said roll under said rubber plates.

Beneath the roll F a channel F' is arranged which is mounted on one end of a casing 35. In this casing two endless bands 32 and 42 of fine-meshed metal gauze are arranged the one above the other. The upper band 32 is moved, at the same speed as the metal band 24, around drums 33 and 34 and extends to underneath the channel F'. The lower band 42 of metal gauze is slightly longer than band 32. Between the two bands of metal gauze 32 and 42 partitions 36 and 43 are arranged, which extend however not to the extreme end of the drum 33. Ribs or plates 38 and 45 are arranged above and below the upper side of the band 32 and of the band 42 on the walls and partitions 35, 36, 43 and 44, said ribs being spaced at convenient distances apart, and those above a band alternating with those arranged below the same. In the neighbourhood of one end of the upper channel G formed by the upper wall of casing 35 and by partition 36, and of the lower channel H formed by the partitions 43 and 44, heating pipes 39 and 46, respectively, are arranged whereas exhausters 40 and 47 are mounted at the other end of the casing 35 or of the channels G and H. The air currents sucked by these exhausters and heated by the heating pipes 39 and 46 flow along serpentine paths in the directions indicated by the arrow lines shown in Fig. 1, owing to the arrangement of the obstacle plates or ribs 38 and 45 and in this way these air currents alternately pass from above to below and from below to above through the bands 32 and 42 respectively of metal gauze. These bands are also guided on rollers 37 corresponding to the rollers 29 of band 24.

In the lower ends of those ribs or obstacle plates 38 and 45, which extend from above towards the bands 32 or 42 short oblique prongs or teeth 59 and 59ᵃ (Figs. 12 and 13) are arranged which extend to closely above the surface of the band moving underneath the same and which serve for a purpose which will be hereinafter described.

A cylindrical brush 41 which is rotatably mounted perpendicularly above the band 42 engages with that portion of the band 32 which is moving over the drum 33. While the upper side of the band 32 travels from left to right, the upper side of the band 42 moves from right to left. A cylindrical brush 48 similar to the brush 41 engages with that portion of the band 42 which is moving over the left drum 34'. The brush 48 is arranged above a funnel 50 under which a sack 49 is attached designed to collect the ready goods.

For carrying out the new method with the aid of the machine described one may proceed as follows:—

The hot, concentrated liquid glue or gelatin flows from the reservoir A through the pipe 1 into the vessel B comprising the float 3 and hence through the pipes 4 into the vessel C. Under the action of the valve plate 11, moved up and down by means of the rods 21, 20, the cranks 19 and the cross bars 18, drops of the liquid are discharged through the tubes 10 and drop upon the smooth metal band 24 travelling beneath vessel C and cooled by the drum 28 to a temperature of about 2–3° C. below zero. The drops, which have dropped onto this endless metal band, freeze and travel with the metal band alternately through an open thawing zone and through a freezing zone in the vessel D, which may be cooled accordingly in a convenient manner. By the freezing of the drops of gelatin or glue the water contained in the same crystallizes for the greatest portion in the form of ice in outward direction and makes the jelly cells of the drops burst so that the drops become porous like a sponge. When the drops hereafter arrive in the thawing zone the ice will melt out of the drops which in this manner will loose the water very rapidly after the glue drops have adopted the porous consistence.

After leaving the last thawing zone the jelly-like drops move on the lower side of the metal band 24, guided by the rollers 29, the cut out portions of these rollers preventing the drops to come into engagement with said rollers. Then the drops come back to the freezing drum 28, where they are removed from the band 24 by the stripping or throwing device F. The rubber plates 30 on the device F strip the jelly-drops off the band 24 and throw the same when the rubber plates 30 recoil against the rigid supports 31 downward into the channel F'. The jelly drops fall through this channel on the band 32 of metal gauze, which is moving preferably at the same speed and in the same direction as the metal band 24. During their movement with the band 32 the jelly drops are dried by the air current sucked in by the fan 40 and heated on the pipes 39, said air current flowing in serpentine shape in the direction of the arrow line through the band 32 of metal gauze from above to below and from below to above.

When moving along the oblique prongs or teeth 59 and 59ᵃ (Figs. 12 and 13) arranged at the lower ends of the ribs 38, in such a manner that the prongs 59ᵃ of one obstacle plate or rib 38 are directed in an opposite direction to the prongs 59 of the neighbouring ribs 38, the solidified drops are shifted to the right and then to the left, as indicated in Fig. 13, and are also turned over at the same time, said prongs 59 and 59ᵃ acting similar to a plow share, whereby the drying of the drops is substantially accelerated. Guiding ribs 59^b arranged at the forward or rearward edges respectively of the lower ends of the obstacle plates 38 prevent the drops from falling over the borders of the band 32 when they are shifted to and fro by the prongs 59 and 59^a respectively.

When the solidified drops on the band 32 arrive over the right hand cylinder 33, they are stripped off by the rotating cylindrical brush 41 and drop onto the band 42 situated underneath the same. The drops on this band 42 are further dried by the air current sucked in by the fan 47 and heated on the pipes 46, and they may be shifted and turned over, if desired, by teeth or prongs corresponding to the teeth or prongs 59 and 59^a of the ribs 38. When the band 42 is moving around the left conveying cylinder 34', the lens or drop shaped particles formed of gelatin or glue which now are perfectly dry, are stripped off by the rotating cylindrical brush 48 and drop into the sack 49.

The removing of the jelly-like drops, which have not yet been dried and therefore are very adhesive, from the freezing band 24 causes sometimes great difficulties, as the particles of material easily stick on the scrapers or similar devices and stick to one another in forming clumps. The particles thus sticking together can not be separated subsequently or only with great difficulty. For avoiding this inconvenience special scraping and separating devices are required. A mechanism specially adapted for this purpose and which might be preferably used instead of the star shaped roll F illustrated in Fig. 8, is shown in Figs. 9 to 11. Its main feature is to be seen in that an air or gas current is blown against the jelly-like drops which are just loosened by the scraper, whereby these drops are separated easily and cleanly from the support and thrown off.

This scraper is formed by a wall 50 on which a casing 51 is mounted. To the top end of this casing a tube 52 is connected which leads to a conduit for compressed air. The casing 51 tapers in downward direction and it has in its lower end a slit-like opening 53, extending over the entire width of the scraper, from which the air or gas under pressure escapes while moving along the wall 50 of the scraper. The casing 51 is preferably fixed by means of braces 55 or the like on a shaft 54 journalled in bearings 56 and pressed against the surface to be treated by means of an adjustable counter weight 58 arranged on a rod 57.

When the jelly-like drops, four of which are indicated in Fig. 9, arrive at the lower edge of this scraper, they are on the one hand lifted by the scraping edge of the wall 50 from the band or other support and are on the other hand treated by the air under pressure, discharged from the slit 53, in such a manner that they are coated with a dry layer on their surface, whereby the separation of the jelly drops from the support is facilitated and their sticking together is prevented. At the same time the separated jelly drops are rapidly blown away by this current of air under pressure so that they will drop onto the gauze band arranged beneath said support.

Instead by a current of air under pressure which, if desired, may be cooled or heated in any convenient manner, the scraper might be operated by currents of another suitable gas under pressure or even by a liquid under pressure. At the same time the scraper is continually sterilized by the action of the compressed air or the like.

Having now particularly described and ascertained the nature of the said invention, it is desired to claim the following:

1. A method of producing solid gelatin and glue in the shape of drops, lenses or the like, which comprises forming separate drops of the concentrated colloid, causing said drops to fall on to a conveying surface, exposing said drops while on said surface first to a temperature below 0° C., and thereafter causing them again to be heated for separating the water or ice which has crystallized from the solidified colloid drops.

2. A method of producing solid, gelatin and glue in the shape of drops, lenses or the like, which comprises forming separate drops of the concentrated colloid, causing said drops to fall on to a conveying surface and conducting said drops while on said surface alternately and repeatedly through freezing and thawing zones.

3. A method of producing solid gelatin and glue in the shape of drops, lenses or the like, which comprises forming separate drops of the concentrated colloid, causing said drops to fall on to a conveying surface, exposing said drops while on said surface first to a temperature below 0° C., thereafter causing them again to be heated for separating the water or ice which has crystallized from the solidified colloid drops, stripping off said solidified colloid drops from said conveying surface, and drying them by air.

4. A method of producing solid gelatin and glue in the shape of drops, lenses or the like, which comprises forming separate drops of the concentrated colloid, causing said drops to fall on to a conveying surface, conducting said drops while on said surface alternately and repeatedly through freezing and thawing zones, stripping off said solidified colloid drops from said conveying surface, and drying them by heat and air.

5. An apparatus for producing solid gelatin and glue in the shape of drops, lenses or the like by causing separate drops of the concentrated colloid to fall on to a conveying surface while cooling, having a dropping device, a conveying surface movably arranged below said dropping device, means for cooling parts of said conveying surface below the freezing point of water, scraping means for separating the solidified drops from said surface, a second movable surface arranged below said first named surface, and means for guiding an air current along said second movable surface.

6. In an apparatus for producing solid gelatin and glue in the shape of drops, lenses or the like by causing separate drops of the concentrated colloid to fall on to a conveying surface while cooling, a vessel, a number of small discharge tubes arranged in the bottom of said vessel, a perforated movable plate within said vessel, pins arranged on the lower surface of said plate, said pins entering into said discharge tubes, means for moving said plates with said pins up and down in said vessel, a conveying surface movably arranged below said dropping device, means for cooling parts of said conveying surface below the freezing point of water, scraping means for separating the solidified drops from said surface, a second movable surface arranged below said first named surface, and means for guiding an air current along said second movable surface.

7. In an apparatus for producing solid gelatin and glue in the shape of drops, lenses or the like by causing separate drops of the concentrated colloid to fall on to a conveying surface while cooling, a vessel, a number of small discharge tubes arranged in the bottom of said vessel, a perforated movable plate within said vessel, pins arranged on the lower surface of said plate, said pins entering into said discharge tubes, means for moving said plates with said pins up and down in said vessel, means for adjusting the stroke of the movement of said plate, a conveying surface movably arranged below said dropping device, means for cooling parts of said conveying surface below the freezing point of water, scraping means for separating the solidified drops from said surface, a second movable surface arranged below said first named surface, and means for guiding an heated air current along said second movable surface.

8. An apparatus for producing solid gelatin and glue in the shape of drops, lenses or the like by causing separate drops of the concentrated colloid to fall on to a conveying surface while cooling, having a dropping device, an uncovered metal band movably arranged below said dropping device, means for cooling parts of said metal band below the freezing point of water, scraping means for separating the solidified drops from said metal band, a second movable metal band arranged below said first named metal band, and means for guiding an air current along said second movable metal band.

9. An apparatus for producing solid gelatin and glue in the shape of drops, lenses or the like by causing separate drops of the concentrated colloid to fall on to a conveying surface while cooling, having a dropping device, a conveying surface movably arranged below said dropping device, means for cooling parts of said conveying surface below the freezing point of water, scraping means for separating the solidified drops from said surface, a second movable surface arranged below said first named surface, said second named surface being formed by a band of metal gauze, and means for guiding an air current along and through said movable band of metal gauze.

10. An apparatus for producing solid gelatin and glue in the shape of drops, lenses or the like by causing separate drops of the concentrated colloid to fall on to a conveying surface while cooling, having a dropping device, a conveying surface movably arranged below said dropping device, means for cooling parts of said conveying surface below the freezing point of water, scraping means for separating the solidified drops from said surface, a second movable surface arranged below said first named surface, said second named surface being formed by a band of metal gauze, a set of obstacle plates spaced from one another and arranged above said band, a second set of obstacle plates spaced a corresponding distance from one another and arranged below said band, said obstacle plates above said band alternating with said obstacle plates below said band, and means for heating and guiding an air current along said movable band.

11. An apparatus for producing solid gelatin and glue in the shape of drops, lenses or the like by causing separate drops of the concentrated colloid to fall onto a conveying surface while cooling, having a dropping device a conveying surface movably arranged below said dropping device, means for cooling parts of said conveying surface below the freezing point of water, scraping means for separating the solidified drops from said surface, a second movable surface arranged below said first named surface, said second named surface being formed by a band of metal gauze, a set of obstacle plates spaced from one another and arranged above said band, a second set of obstacle plates spaced a corresponding distance from one another and arranged below said band, said obstacle plates above said band alternating with said obstacle plates below said band, spaced oblique prongs arranged side by side at the lower ends of said obstacle plates above said gauze band, the oblique arrangement of said prongs of one obstacle plate differing from that of the prongs of a neighbouring obstacle plate, and means for guiding a heated air current along said movable gauze band.

12. An apparatus for producing solid gelatin and glue in the shape of drops, lenses or the like by causing separate drops of the concentrated colloid to fall on to a conveying surface while cooling, having a dropping device, a conveying surface movably arranged below said dropping device, means for cooling parts of said conveying surface below the freezing point of water, a scraper for separating the solidified drops from said surface, means for conducting a fluid under pressure against the working point of said scraper, a second movable surface arranged below said first named surface, and means for guiding an air current along said second movable surface.

13. An apparatus for producing solid gelatin and glue in the shape of drops, lenses or the like by causing separate drops of the concentrated colloid to fall on to a conveying surface while cooling, having a dropping device, a conveying surface movably arranged below said dropping device, means for cooling parts of said conveying surface below the freezing point of water, a scraper for separating the solidified drops from said surface, a casing connected with said scraper, a slit-like opening in said casing near the working edge of said scraper, means for conducting a fluid under pressure into said casing, a second movable surface arranged below said first named surface, and means for guiding an air current along said second movable surface.

14. An apparatus for producing solid gelatin and glue in the shape of drops, lenses or the like by causing separate drops of the concentrated colloid to fall on to a conveying surface while cooling, having a dropping device, a conveying surface movably arranged below said dropping device, means for cooling parts of said conveying surface below the freezing point of water, a scraper for separating the solidified drops from said surface, a casing connected with said scraper, a slit-like opening in said casing near the working edge of said scraper, said casing tapering in wedge-shape towards said opening, means for conducting a fluid under pressure into said casing, a second movable surface arranged below said first named surface, and means for guiding an air current along said second movable surface.

15. In an apparatus for producing solid gelatin and glue in the shape of drops, lenses or the like by causing separate drops of the concentrated colloid to fall on to a conveying surface while cooling, a vessel, a number of small discharge tubes arranged in the bottom of said vessel, a perforated movable plate within said vessel, pins arranged on the lower surface of said plate, said pins entering into said discharge tubes, means for moving said plate with said pins up and down in said vessel, an uncovered metal band movably arranged below said vessel, means for cooling parts of said metal band below the freezing point of water, a scraper for separating the solidified drops from said metal band, means for conducting a fluid under pressure against the working point of said scraper, a second band arranged below said first named band, said second band being formed from metal gauze, means for guiding the solidified drops scraped from said first named band on to said second named band, means for moving said second band in opposite direction to said first band, and means for guiding an air current along and through said gauze band.

In testimony whereof I have hereunto set my hand.

ANNA GREINER, née BRECHT,
*Administratrix of the Estate of Carl Greiner, Deceased.*